United States Patent
Danler-Baumgartner et al.

(10) Patent No.: US 10,586,142 B2
(45) Date of Patent: Mar. 10, 2020

(54) FINGER-CONTROLLED CONTACTLESS CHIP CARD

(71) Applicant: Smart Packaging Solutions, Rousset (FR)

(72) Inventors: Stephan Danler-Baumgartner, Rousset (FR); Benjamin Mear, Rousset (FR); Deborah Teboul, Rousset (FR)

(73) Assignee: SMART PACKAGING SOLUTIONS, Rousset (FR)

( * ) Notice: Subject to any disclaimer, the term of this patent is extended or adjusted under 35 U.S.C. 154(b) by 0 days.

(21) Appl. No.: 16/083,245

(22) PCT Filed: Mar. 9, 2017

(86) PCT No.: PCT/FR2017/000046
§ 371 (c)(1),
(2) Date: Sep. 7, 2018

(87) PCT Pub. No.: WO2017/153644
PCT Pub. Date: Sep. 14, 2017

(65) Prior Publication Data
US 2019/0102663 A1    Apr. 4, 2019

(30) Foreign Application Priority Data
Mar. 9, 2016    (FR) ..................... 16 00398

(51) Int. Cl.
*G06K 19/06* (2006.01)
*G06K 19/073* (2006.01)
(Continued)

(52) U.S. Cl.
CPC ... *G06K 19/07336* (2013.01); *G06K 19/0726* (2013.01); *G06K 19/07318* (2013.01); *G06K 19/07788* (2013.01); *G06K 19/07794* (2013.01)

(58) Field of Classification Search
CPC ............ G06K 19/07749; G07F 7/1008; G06Q 20/341
(Continued)

(56) References Cited

U.S. PATENT DOCUMENTS 6,424,029 B1    7/2002 Giesler
2009/0277964 A1    11/2009 Schroeder
(Continued)

FOREIGN PATENT DOCUMENTS

FR    2919409 A1    1/2009
FR    2982687 A1    5/2013

OTHER PUBLICATIONS

International Search Report (PCT/ISA/210) dated Jul. 18, 2017, by the European Patent Office as the International Searching Authority for International Application No. PCT/FR2017/000046.
(Continued)

*Primary Examiner* — Ahshik Kim
(74) *Attorney, Agent, or Firm* — Buchanan Ingersoll & Rooney PC

(57) ABSTRACT

A contactless chip card intended to communicate with a chip card reader operating at a first resonant frequency includes a booster antenna provided with an inductive main antenna and with an inductive concentrator antenna, which antennae are connected in series or parallel with a capacitor. The inductances of the inductive main antenna and the inductive concentrator antenna and the capacitance of the capacitor are chosen on the one hand to obtain a second resonant frequency that is far enough from the frequency of the signal emitted by the reader to limit radiofrequency communication with the reader, and on the other hand so that the connection in parallel of a predetermined capacitance brings the resonant frequency of the card into the vicinity of said first resonant frequency of the signal emitted by said reader.

7 Claims, 2 Drawing Sheets

(51) Int. Cl.
*G06K 19/07* (2006.01)
*G06K 19/077* (2006.01)

(58) Field of Classification Search
USPC .......................................................... 235/492
See application file for complete search history.

(56) References Cited

U.S. PATENT DOCUMENTS

| | | | |
|---|---|---|---|
| 2010/0283690 A1 | 11/2010 | Artigue et al. | |
| 2013/0134224 A1 | 5/2013 | Sabbah | |
| 2014/0198011 A1* | 7/2014 | Tsubaki | H01Q 7/06 343/867 |
| 2015/0116168 A1* | 4/2015 | Yosui | H01Q 7/00 343/722 |
| 2018/0287242 A1* | 10/2018 | Ozawa | H01Q 1/24 |
| 2018/0373970 A1* | 12/2018 | Seban | G06K 19/0726 |

OTHER PUBLICATIONS

Written Opinion (PCT/ISA/237) dated Jul. 18, 2017, by the European Patent Office as the International Searching Authority for International Application No. PCT/FR2017/000046.

* cited by examiner

FINGER-CONTROLLED CONTACTLESS CHIP CARD

FIELD OF THE INVENTION

The present invention relates to the field of chip cards with contactless operation or with mixed contact-based and contactless operation that are capable of interacting with a chip card reader by way of radiofrequency communication. Insofar as they all have at least one contactless communication interface, they will all be referred to using the term 'contactless cards' so as to simplify the disclosure.

Some of these cards are used for sensitive applications, for example contactless cards used for banking applications, such as contactless payment.

One problem that limits the use of contactless cards for making payments lies in the fact that users are afraid, sometimes justifiably so, that a third party situated nearby may use the card without said users' knowledge, by way of what is known as a 'skimming' operation. This operation consists in making the card react or even in using said card by way of a contactless reader, without the knowledge of its owner.

PRIOR ART

What are known as 'anti-skimming' techniques that are able to combat undesired use of the card have already been developed, in particular in the context of security documents of electronic passport type, which take the form of a booklet. Specifically, as provided for in patent FR 2919409, the antenna that allows radiofrequency communication for the document is situated straddling the two covers of the passport, such that when said passport is in the closed position, the antenna is folded back on itself and prevents any radiofrequency operation.

Such a solution is not applicable to chip cards, which are not able to be folded.

Also known are metal cases for chip cards, forming a Faraday cage around the chip card when said chip card is stored in said case, but use thereof is not very practical.

Other solutions have been contemplated in which the chip card is provided with a start/stop button that makes it possible manually to disconnect the electronic circuits or the antenna from the chip card. However, these solutions are difficult to implement on an industrial scale. In particular, installing start/stop buttons poses reliability and cost problems.

Documents US 2009/277964 A1, FR 2 982 687 A1 or U.S. Pat. No. 6,424,029 B1 furthermore disclose solutions in which a contactless chip card has a chip connected directly to an antenna and an external control means, such as a finger, for modifying the resonant frequency of the antenna. However, these solutions are relatively ineffective because, with the antenna always remaining connected to the chip, it is enough to increase the power of the device for interrogating the card to establish an exchange of power and/or of data with the chip card, thereby limiting the security thereof.

Aims of the Invention

The general aim of the present invention is to solve the problems posed and to propose a chip card that makes it possible to prevent any use without the knowledge of its owner, while at the same time providing a simple and reliable solution, in particular without a pushbutton and other added components, while at the same time increasing the security level of the product.

Another aim of the invention is to propose a solution that is easy to implement on an industrial scale with a high manufacturing yield and high reliability.

Subject of the Invention

In principle, the invention consists in designing the radiofrequency circuit of the card by integrating into it a booster antenna that is not connected electrically to the antenna of the electronic module, and in choosing the operating parameters such that the assembly formed by the electronic module and the booster antenna is detuned by default, and that only the intentional modification of the tuning capacitance by the user will make it possible to tune the resonant frequency of the product with the resonant frequency of the chip card readers, so as to allow contactless communication between the card and the reader.

In an innovative manner, this intentional modification of the tuning capacitance consists in using the capacitance of one or more fingers of the user and in simply placing one or more fingers at one or more given locations of the chip card, which, by virtue of the invention, will have the effect of retuning the resonant frequency of the chip card so as to allow it to operate.

The subject of the invention is therefore a chip card with contactless operation, intended to communicate with a chip card reader operating at a resonant frequency $F_0'$, said chip card being provided with a card body incorporating at least one antenna connected in series or in parallel with a capacitor, the values of the inductances of the antennae and the capacitance of the capacitor being chosen so as to achieve a resonant frequency $F_0$ remote enough from the frequency of the signal emitted by the reader to limit radiofrequency communication with the reader, such that the chip card is detuned by default with respect to the reader, and the values of said inductances and capacitor furthermore being chosen so that the connection, in parallel, of a predetermined additional capacitance $C_d$ brings the resonant frequency of the card close to the frequency $F_0'$ of the signal emmitted by said reader, such that the chip card is retuned with the reader, characterized in that the chip card includes a booster antenna provided with a main antenna with inductance $L_1$ and with a concentrator antenna with inductance $L_2$ that are connected in series or in parallel with a capacitor C, and in that the values of $L_1$, $L_2$ and C are chosen firstly so as to achieve said resonant frequency $F_0$ and secondly so that the connection, in parallel, of said predetermined capacitance $C_d$ brings the resonant frequency of the card close to said frequency $F_0'$ of the signal emitted by said reader.

In this way, the booster antenna makes it possible to eliminate any physical connection to the antenna of the module, which antenna is connected to the microelectronic chip, and the fact that the adjustment of the resonant frequency involves a capacitor $C_d$ connected to the booster antenna and not to the antenna of the module makes it possible to make tuning and detuning with respect to the reader much more effective, while at the same time allowing a method for manufacturing the chip card that is more reliable and more effective than in the case of a card without a booster antenna.

Advantageously, said predetermined capacitance $C_d$ for bringing the resonant frequency of the card close to the frequency $F_0'$ of the signal emitted by said reader corresponds to the capacitance of one or more fingers placed between metal contacts of the card. In this way, it is enough for the user to place a finger at a predetermined location of the chip card, or a combination of fingers at several predetermined locations of the card, to allow operation thereof with a contactless reader.

It has been found that the predetermined capacitance $C_d$ preferably has a value of the order of 7 picofarads, which may be created by placing a finger straddling an electric dipole inserted in parallel with the main capacitor C of the antenna.

According to one particular embodiment of the invention, the values of $L_1$, $L_2$ and C are chosen such that $L_1+L_2$ is greater than or equal to 4 µH, and that C is of the order of 20 picofarads.

According to a first embodiment, the capacitor $C_d$ is produced in the form of a metal wire embedded in the antenna carrier and arranged in the form of a coil, located by a marker on a face of the chip card.

According to a second embodiment, the capacitor $C_d$ is produced in the form of a pair of metal half-dots arranged facing one another such that a finger placed straddling the half-dots creates an adjusting capacitance $C_d$ that is connected in parallel with the capacitor C of the antenna. According to one variant of this second embodiment, the capacitor $C_d$ is produced in the form of several pairs of metal half-dots arranged facing one another such that a combination of several fingers placed straddling several pairs of half-dots creates an adjusting capacitance $C_d$ of the order of 7 pF that is connected in parallel with the capacitor C of the antenna.

BRIEF DESCRIPTION OF THE SEVERAL VIEWS OF THE DRAWINGS

The invention will be better understood upon reading the following description and the drawings, in which.

DETAILED DESCRIPTION OF THE INVENTION

Figure 1:
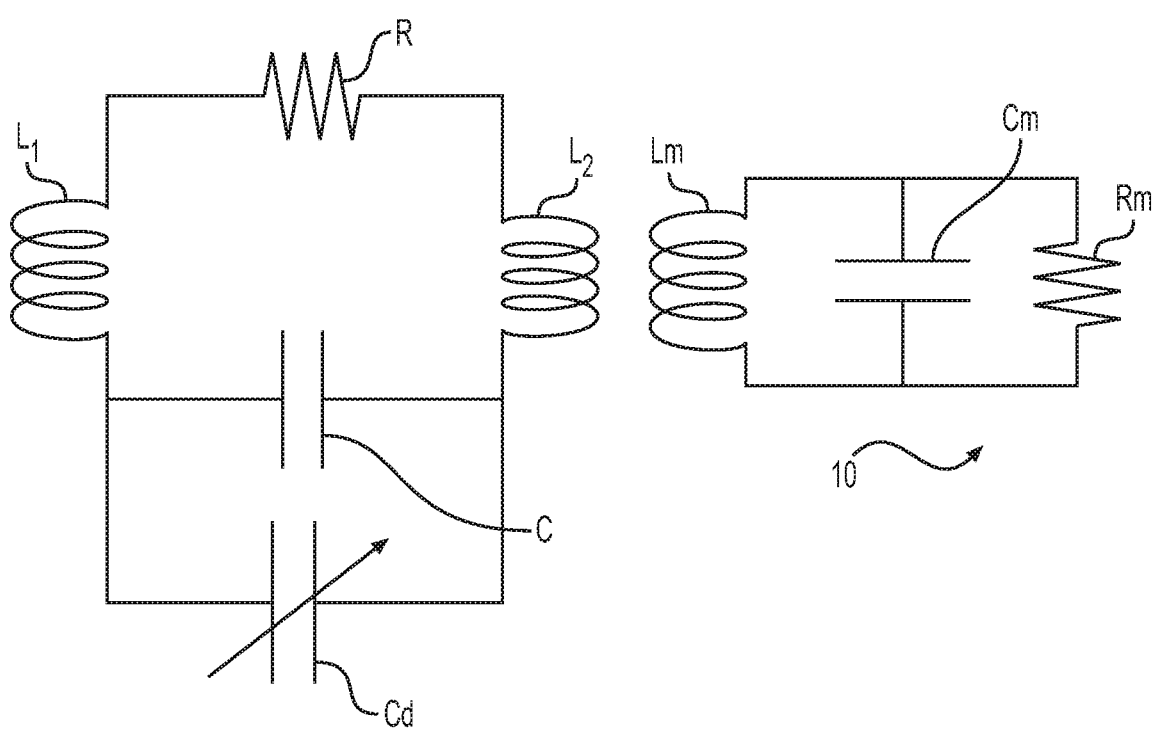
FIG. 1 shows the equivalent circuit diagram of a contactless chip card according to the invention.

FIG. 1 shows the equivalent circuit diagram of a chip card, comprising an electronic module 10 provided with an electronic chip (not shown) and with an antenna, and a booster antenna 20 arranged in the card body.

The electronic module 10 is equivalent to an RLC circuit, with a resistor $R_m$, a capacitor $C_m$ and an inductor $L_m$ connected in parallel.

The booster antenna 20 includes a concentrator antenna with inductance $L_2$ (and denoted $L_2$) coupled to the antenna $L_m$ of the module, a resistor R, an antenna with inductance $L_1$ and denoted $L_1$, and a capacitor C. The antenna $L_1$ has large turns that are generally arranged on the perimeter of the card body, in what is known as an ID1 format, in accordance with the ISO/CEI 7810 standard. This ID1 format corresponds to cards with dimensions of 85.60×53.98 mm.

The equivalent circuit diagram also shows a variable capacitor $C_d$ across the terminals of the booster antenna 20. This is the capacitance formed by the finger(s) of the user when this finger or these fingers is/are placed on the card.

According to the invention, the finger(s) will be placed on visual markers that are printed on the card body opposite one or more electric dipoles formed by two metal pads placed side by side, such that, when the user's finger is absent, there is an open circuit (this corresponding to a zero capacitance $C_d$) and that, when the user's finger is present, there is a nonzero capacitance $C_d$ of a few picofarads.

Specifically, the invention makes provision to use the capacitance of the user's finger as a switch that allows operation of the card in contactless mode.

Specifically, it has been found that the capacitance of a finger may be relatively stable from one user to another and depending on moisture conditions or other conditions. Tests have shown that the capacitance of a finger varies substantially within a range of 6.5 to 7.5 pF for a given dipole surface.

The invention exploits this feature by choosing values for the components $L_1$, $L_2$ and C of the booster antenna 20 of the card that bring about a resonant frequency that is greatly offset with respect to the resonant frequency of the reader, which means that the card is by default detuned with respect to the reader.

Thus, the resonant frequency of the booster antenna 20 is of the following type:

$$F_0 = 1/(2*\Pi*\sqrt{(L_1+L_2)}*C)$$

Therefore, if the operating frequency of the chip card reader is of the order of 13.56 MHz, as is often the case in the field of contactless cards and their readers, the values of $L_1$, $L_2$ and C will be chosen so that, when the user's finger is absent (that is to say $C_d=0$), a resonant frequency of the booster antenna 20 is achieved that is more than 1 MHz away from the target frequency of 13.56 MHz.

With such an offset resonant frequency, the chip card will be detuned with respect to the reader and will not be able to communicate with the chip card reader without intentional modification of the resonant circuit that is able to bring the resonant frequency of the booster antenna close to 13.56 MHz.

This modification will be made by adding the capacitance $C_d$ introduced by one or more of the user's fingers.

Specifically, the resonant frequency of the booster antenna, when a finger is positioned on the card, will be expressed using the following formula:

$$F_0' = 1/(2*\Pi*\sqrt{(L_1+L_2)}*(C+C_d))$$

with the knowledge that the electric dipoles where the finger(s) will be placed may be configured so that the additional capacitance $C_d$ is of the order of 7 pF.

It is therefore possible to determine a set of values of $L_1$, $L_2$ and C that bring about a resonant frequency $F_0$ of greater than or equal to 14.7 MHz, and a value $F_0'$ (taking into account a value $C_d$ of the order of 7 picofarads) equal to 13.56 MHz.

Pairs of values that have been tested and that work are for example as follows:

$L_1+L_2$ greater than or equal to 4 µH

C approximately equal to 20 pF.

Of course, other sets of values are possible and will easily be determined by those skilled in the art. It is simply necessary for the inductance $L_1+L_2$ to be very high (at least 4 µH) in order for a small variation in the capacitance C to cause a significant variation in the resonant frequency $F_0$.

Figure 2:
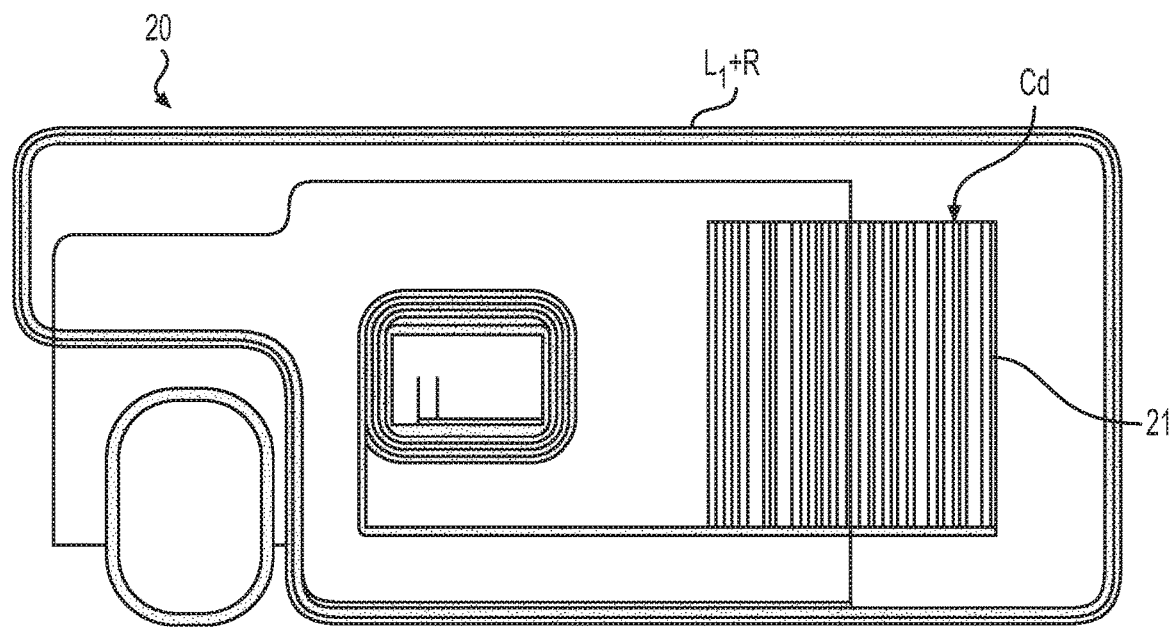
FIG. 2 shows a first embodiment of the antenna of the chip card according to the invention.

FIG. 2 shows a first embodiment of a booster antenna 20 for a chip card incorporating a capacitor $C_d$ produced in wired form by very thin metal wires 21 embedded in the antenna carrier film using ultrasound and arranged in a coil or a very tight sinusoid.

To materialize the position of this wired capacitor, a visual marker (not shown) will be placed on an outer face of the chip card, opposite the capacitor $C_d$. The user will thus know where to place his finger in order to retune the chip card to the target frequency, for example 13.56 MHz in this case.

Figure 3:
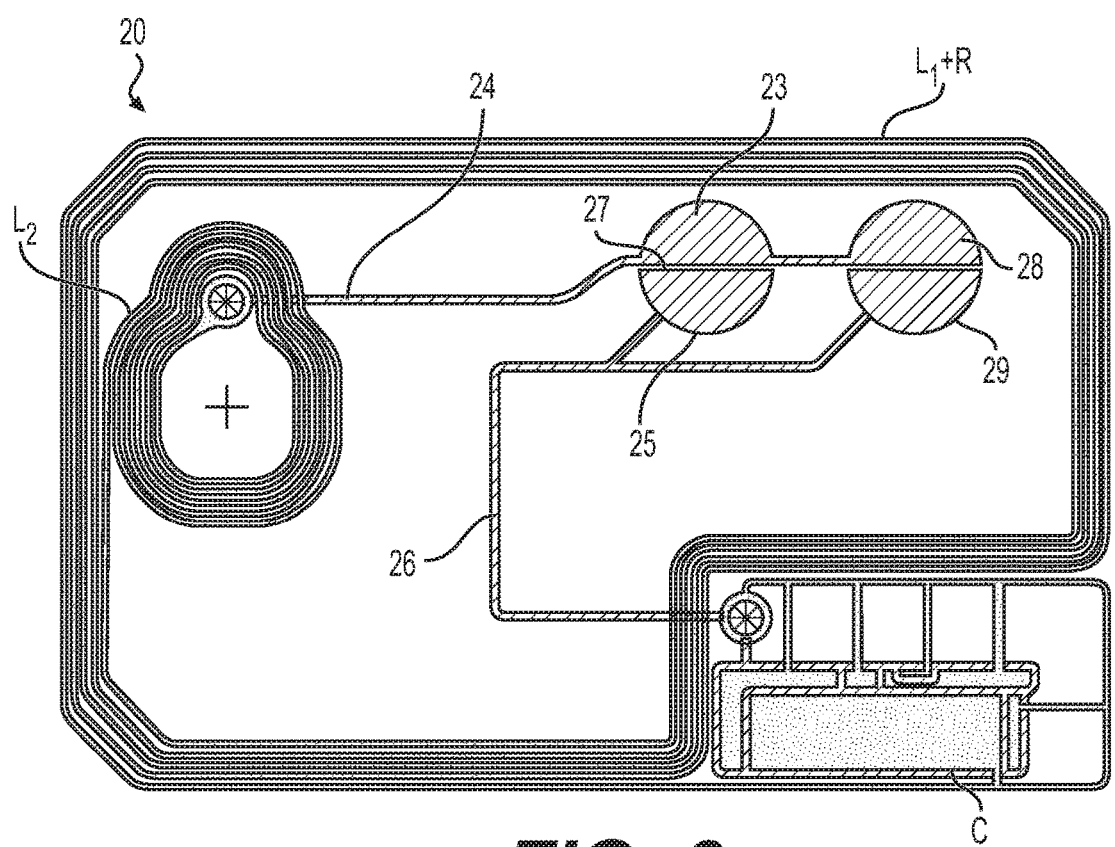
FIG. 3 shows a second embodiment of the antenna of the chip card according to the invention.

FIG. 3 shows a booster antenna 20 with a second embodiment of the capacitor $C_d$, in the form of a metal circuit etched at the same time as the metal tracks of the antennae $L_1$, $L_2$ and connected in parallel between $L_1$ and $L_2$.

This etched metal circuit includes at least one dipole formed by a first metal half-dot 23 connected to the antenna $L_2$ by a track 24, and a second half-dot 25 connected to the antenna $L_1$ by a track 26. The two half-dots 23, 25 are separated by a space 27, which means that their capacitance is zero when there is no finger placed straddling the two half-dots, and that their capacitance $C_d$ is equal to around 7 pF when a finger is placed straddling the two half-dots 23, 25.

Again, it will be useful to mark the location of the two half-dots 23, 25 using an appropriate marker on an outer face of the chip card so as to guide the user.

In the two embodiments of the capacitor $C_d$ according to FIGS. 2 and 3, it would be possible (as outlined in FIG. 3 by the half-dots 28, 29) to divide the capacitor $C_d$ into several portions produced in wired form or in etched form, into several subsets that are connected in parallel, so as to have to use a combination of several fingers placed at various locations of the card to create an equivalent capacitance of the order of 7 pF. Furthermore, this would make it possible to further strengthen the security of the chip card, by ensuring that only an intentional placement of several of the user's fingers facing the various antenna portions creates the tuning capacitance $C_d$.

Advantages of the Invention

The invention achieves the aims that were set. The choice of the components for making the resonant frequency of the booster antenna remote from the resonant frequency of the reader makes it possible to ensure that the card is not able to operate and therefore perform transactions as it is. On the other hand, placing a finger on the card to create an additional adjusting capacitance $C_d$ brings the resonant frequency into a range that allows the card to operate with the reader, with the communication quality and distance performance that is normally required.

Furthermore, the invention is particularly easy to implement as it does not require any modification of the structure of the card, but only a particular choice of the values of the components L, C of its booster antenna.

The invention claimed is:

1. A chip card with contactless operation, configured to communicate with a chip card reader operating at a first resonant frequency, said chip card comprising:
    a card body;
    at least one module antenna connected in series or in parallel with a first capacitor, the at least one module antenna and the first capacitor being incorporated in the card body, wherein inductances of the at least one module antenna and the capacitance of the first capacitor have values that achieve a second resonant frequency remote enough from the first resonant frequency of a signal emitted by the reader to limit radiofrequency communication with the reader, such that the chip card is detuned by default with respect to the reader, and such that the connection, in parallel, of a predetermined additional capacitance $C_d$ brings the resonant frequency of the card close to the first resonant frequency of the signal emitted by said reader, such that the chip card is retuned with the reader; and
    a booster antenna incorporated in the card body, the booster antenna being provided with a main antenna with inductance $L_1$ and with a concentrator antenna with inductance $L_2$ that are connected in series or in parallel with a second capacitor having a capacitance C, and wherein the values of $L_1$, $L_2$ and C are chosen firstly so as to achieve said second resonant frequency and secondly so that the connection, in parallel, of said predetermined capacitance $C_d$ brings the resonant frequency of the card close to said first resonant frequency of the signal emitted by said reader.

2. The chip card as claimed in claim 1, wherein said predetermined capacitance $C_d$ for bringing the resonant frequency of the card close to the first resonant frequency of the signal emitted by said reader corresponds to the capacitance of a finger placed between two metal contacts of the card.

3. The chip card as claimed in claim 2, wherein the predetermined capacitance $C_d$ has a value of the order of 7 picofarads.

4. The chip card as claimed in claim 1, wherein the values of $L_1$, $L_2$ and C are chosen such that $L_1+L_2$ is greater than or equal to 4 µH, and C is of the order of 20 picofarads.

5. The chip card as claimed in claim 1, wherein the additional capacitance $C_d$ is provided by a third capacitor produced in the form of a metal wire embedded in an antenna carrier and arranged in the form of a coil, located by a marker on a face of the chip card.

6. The chip card as claimed in claim 1, wherein the additional capacitance $C_d$ is provided by a third capacitor produced in the form of at least two metal half-dots arranged facing one another such that a finger placed straddling the half-dots creates an adjusting capacitance of the order of 7 pF that is connected in parallel with the second capacitor.

7. The chip card as claimed in claim 6, wherein the additional capacitance $C_d$ is provided by a third capacitor produced in the form of several pairs of metal half-dots arranged facing one another such that a combination of several fingers placed straddling several pairs of half-dots creates an adjusting capacitance of the order of 7 pF that is connected in parallel with the second capacitor.

* * * * *